Jan. 26, 1954

A. F. MYERS 2,667,087

TRANSFER CASE DIFFERENTIAL MECHANISM

Filed Oct. 10, 1951

INVENTOR
Albert F. Myers
BY
Cameron, Kerkam & Sutton
ATTORNEYS

INVENTOR
Albert F. Myers
BY Cameron, Kerkam & Sutton
ATTORNEYS

A. F. MYERS 2,667,087

TRANSFER CASE DIFFERENTIAL MECHANISM

Filed Oct. 10, 1951

INVENTOR

Albert F. Myers

BY
Cameron, Kerkam & Sutton
ATTORNEYS

Jan. 26, 1954 — A. F. MYERS — 2,667,087
TRANSFER CASE DIFFERENTIAL MECHANISM
Filed Oct. 10, 1951 — 9 Sheets-Sheet 9

INVENTOR
Albert F. Myers
BY Cameron, Kerkam & Sutton
ATTORNEYS

Patented Jan. 26, 1954

2,667,087

UNITED STATES PATENT OFFICE 2,667,087

TRANSFER CASE DIFFERENTIAL MECHANISM

Albert F. Myers, Berkley, Mich., assignor, by mesne assignments, to Patent Developers, Inc., Detroit, Mich., a corporation of Michigan Application October 10, 1951, Serial No. 250,664

23 Claims. (Cl. 74—650)

1

This invention relates to the driving mechanism of automotive vehicles, and is particularly directed to the provision of new and improved differential mechanisms of the automatic overrunning or declutching type for distributing driving torque between the axles of vehicles which are adapted to drive on more than one axle. Inasmuch as devices of this character are customarily installed in transfer cases or drop boxes, they will be referred to hereinafter as "transfer case differentials," for convenience.

Differential mechanisms are already known which comprise a central annular driving member having clutch teeth formed on the opposite sides thereof, a pair of driven members, axially shiftable against spring pressure, having clutch teeth engageable with those of the driving member and driving connections to the axles, and cooperating cam elements associated with the driving and driven members, respectively, which repeatedly declutch and reengage either driven member when its associated axle overruns the driving member. See, for example, my Patent No. 2,329,075 and Knoblock Patent No. 2,329,059, both dated September 7, 1943. In these prior devices, the repeated meshing and demeshing of the clutch and cam teeth during overrunning gives rise to certain disadvantages which limit their utility as transfer case differentials and which it is the aim of this invention to overcome.

It has also been proposed to incorporate in these known forms of differentials additional cam rings, commonly designated as holdout rings, which move both axially with and rotatably relative to the demeshed members and function to prevent reengagement of the latter as long as the overrunning continues. Two such structures are disclosed in the copending application of Frederick D. Knoblock, Serial No. 87,280, filed April 13, 1949, now Patent #2,638,794. One of the objects of the present invention is to improve and simplify the construction and mode of operation of the devices of this Knoblock application, and to adapt them especially for transfer case use.

Another object of the invention is to provide a transfer case differential of novel construction which is usable either as the interaxle differential of a 4 x 4 or 6 x 4 dual axle drive or as a torque distributor between the front axle or bogie and the rear bogie of a 6 x 6 or 8 x 8 vehicle. The first numeral of the above expressions represents the number of wheels on the vehicle, and the second numeral represents the number of wheels which are driven by the power source.

A further object is to produce a differential of the character described of simple design which is particularly well adapted for installations wherein one side of the differential is required to provide a positive drive at all times to one axle or bogie while the other axle or bogie normally overruns and is positively driven only when the first one loses traction.

Still another object is to provide an improved differential of the automatic overrunning type which is rugged and dependable in operation, requires a minimum of machining in its manufacture, and can be readily installed and serviced in the field without danger of incorrect assembly or orientation.

These and other objects will appear more fully upon consideration of the following detailed description of the various embodiments of the invention which have been illustrated in the accompanying drawings. It is to be expressly understood, however, that these drawings are exemplary only and are not to be construed as defining the limits of the invention, for which latter purpose reference should be had to the appended claims.

Referring now to the drawings, wherein like reference characters indicate like parts throughout the several views:

Figs. 22 and 23 are face and sectional views, respectively, of a modified form of holdout ring usable in the differential of Figs. 17-21, while

Figure 1:
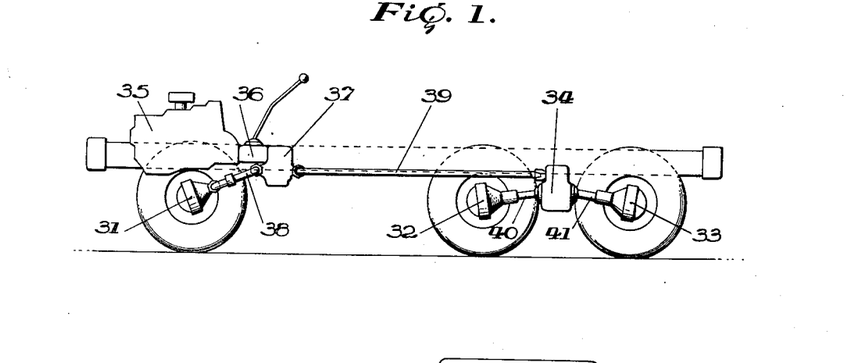
Fig. 1 is a diagrammatic representation of the driving mechanism of one form of automotive vehicle in which the transfer case differentials of the present invention find particular utility.

There is illustrated in Fig. 1 one type of automotive vehicle wherein the transfer case differentials of the present invention are particularly useful, this figure representing the driving mechanism of a 6 x 6 truck having a front driving axle 31 and a rear bogie comprising tandem driving axles 32 and 33 with an intermediate transfer case 34, all three axles being driven from the engine 35 through a transmission 36 and a forward transfer case or drop box 37 located adjacent the front axle 31. From the drop box 37, driving torque may be transmitted to the front axle 31 through a relatively short shaft 38 and to the transfer case 34 of the rear bogie by a propeller shaft 39, the tandem driving axles 32 and 33 in turn being driven from transfer case 34 through short shafts 40 and 41.

While all three of the axles may normally receive driving torque, it is frequently desirable, particularly in vehicles intended for military use, to so design the driving mechanism that the front axle 31 normally is not driven, but receives driving torque only when the wheels of the rear axles 32 and 33 lose traction. To this end, the front axle 31 is so designed as to normally overrun the engine-driven element in drop box 37 which is adapted to supply driving torque to the shafts 38 and 39, and means are provided for effecting a positive drive to the front axle only when the engine-driven element speeds up relative to the front axle sufficiently that its speed is equivalent to that of the front shaft 38, as would occur when the rear wheels start to slip. To obtain the normal overrunning action of the front axle, its ring gear may be provided with a few more teeth than the ring gears of the tandem axles 32 and 33, the result being that, with all wheels rolling at substantially the same speed, the front wheels drive the shaft 38 at a slightly greater velocity than the propeller shaft 39 is driven by the engine-driven member in drop box 37. In order that this arrangement may function properly, there must be interposed between the shaft 38 and the engine-driven member in the drop box a device of the overrunning clutch type which will disconnect shaft 38 and the engine-driven member as long as the speed of the former exceeds that of the latter, but will form a positive driving connection therebetween whenever the speed of the engine-driven member becomes equal to that of said shaft.

The differential mechanisms of the present invention are especially well adapted for use either as the power output element of drop box 37 which provides a positive drive at all times to propeller shaft 39 and simultaneously functions as an overrunning clutch between the shaft 38 leading to the front axle 31 and the engine-driven gearing of the drop box, or as the interaxle differential in transfer case 34 which divides the torque between shafts 40 and 41 and axles 32 and 33.

Turning now to Figs. 2-14, there is shown therein one embodiment of the invention intended for use in the interaxle transfer case 34 which will permit either of the tandem driving axles 32 and 33 to overrun the other, as when traveling over uneven ground or when the tire diameters are unequal, but will not permit either axle to be driven from the engine at a greater speed than the other. This mechanism is so constructed that, when one axle overruns the other, the driven member of the differential connected to the overrunning axle is disengaged or declutched from the central driving member and is maintained in disengaged or declutched position as long as the overrunning continues, but automatically returns to engaged or clutched position when the overrunning ceases.

Figure 2:
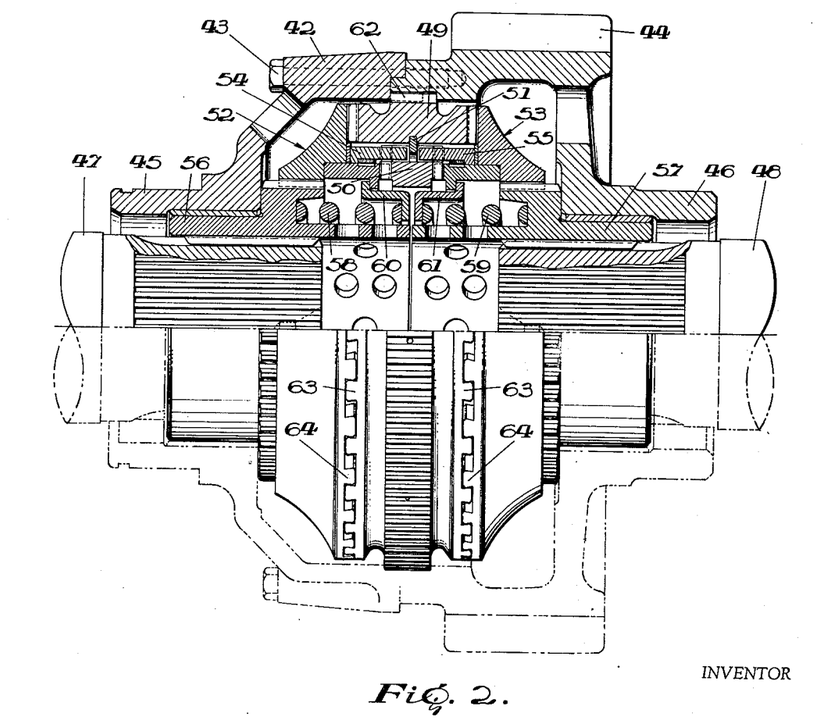
Fig. 2 is a side view, partially in section, of one form of differential embodying the invention which may be used in the interaxle transfer case of the vehicle shown in Fig. 1.
Figure 3:
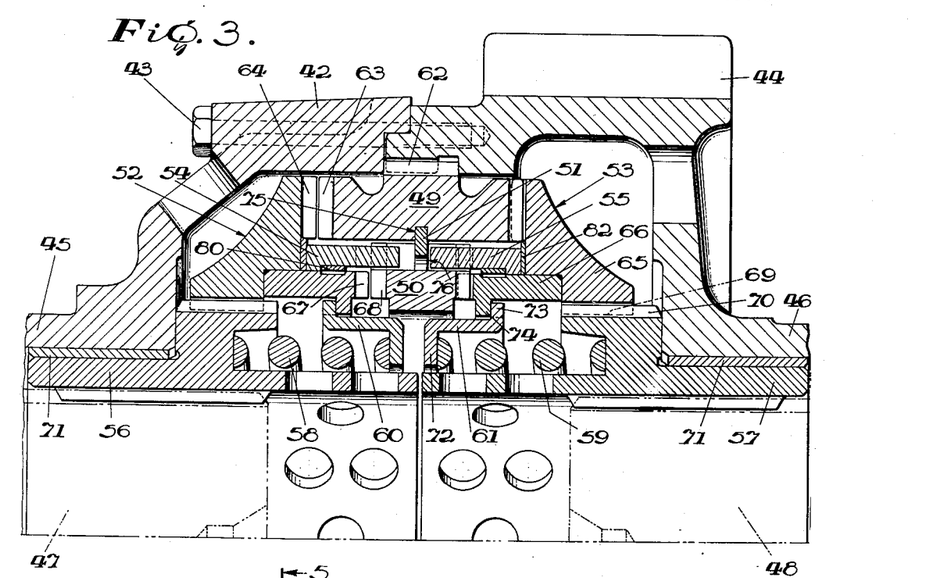
Fig. 3 is an enlarged half axial section of the differential of Fig. 2 showing the position of the parts when the front axle of the tandem bogie of Fig. 1 is overrunning.

As shown best in Figs. 2 and 3, the differential assembly is housed in a two-part casing 42, held together by bolts 43, which casing is provided with an external gear 44 adapted to be driven continuously from the engine 35 through the propeller shaft 39 and appropriate gearing in the transfer case 34 of Fig. 1, and with a pair of horizontally projecting bosses 45 and 46 into which extend the inner ends of opposed shafts 47 and 48 which are in turn operatively connected to the axle driving shafts 40 and 41, respectively, in any suitable manner, as by universal joints.

The differential mechanism mounted in the casing 42 comprises as its principal elements an annular center driving clutch member 49, a center cam member 50 rotatably mounted within the center driving member 49 by means of a snap ring 51, a pair of driven combined clutch and cam members 52 and 53 located on opposite sides of the center driving and cam members, a pair of holdout rings 54 and 55 mounted on the driven clutch and cam members 52 and 53, respectively, and also cooperating with the center cam member 50, a pair of side sleeve members 56 and 57 which serve as driving connections between the driven clutch and cam members 52 and 53 and the shafts 47 and 48, respectively, and a pair of compression springs 58 and 59 and associated spring retainers 60 and 61 which are so arranged as to yieldably urge the clutch and cam members of the assembly into engagement with one another.

The outer peripheral surface of center driving member 49 is provided with axially extending splines 62 which engage a correspondingly internally splined portion of the differential casing 42 adjacent the joint between the two parts of said casing, the splined connection between the elements being so formed, as shown in Figs. 2 and 3, as to prevent both rotational and axial movement of the driving member 49 relative to the casing 42. The driving member is also provided on each of its side faces with a set of driving clutch teeth 63, preferably slightly undercut, which are adapted to engage similar driven clutch teeth 64 formed on the opposing side faces of the driven clutch and cam members 52 and 53. As indicated in the lower portion of Fig. 2, the spaces between adjacent teeth of each set are wider than the clutch teeth themselves so as to facilitate disengagement of the teeth when one of the driven members is moved axially outwardly away from the driving member by operation of the cam members when the associated shaft 47 or 48 attempts to rotate at a greater velocity than the driving member 49.

In the embodiment illustrated, each of the driven members 52 and 53 consists of two parts separately formed but permanently welded together to form a unitary annular assembly, the main or clutch part 65 carrying the driven clutch teeth 64 and being recessed at its inner periphery to receive the other part which is in the form of a cam ring 66. The cam ring 66 extends axially inwardly beyond the plane of driving clutch teeth 63 and is provided on its inner edge with a plurality of cam teeth 67 adapted to cooperate with similar cam teeth 68 formed on the side faces of center cam member 50.

In order to enable outward axial movement of the driven members 52 and 53 relative to the center driving member 49 to effect disengagement of the clutch teeth 63 and 64 when overrunning occurs, the clutch parts 65 of the driven members are internally splined as indicated at 69 and slidably mounted on similarly externally splined portions 70 of sleeve members 56 and 57. The sleeve members 56 and 57, which are also internally splined to receive the splined inner ends of shafts 47 and 48, are rotatably supported in the bosses 45 and 46 of casing 42 by means of suitable bushings 71, but are immobilized against outward axial movement by abutment of their splined portions 70 against the inner edges of the bosses 45 and 46. As shown in Fig. 3, the internally splined portions 69 of the driven members are shorter than the externally splined portions 70 of the sleeve members 56 and 57 so as to leave sufficient clearance between the outer edges of the driven members and the side walls of the casing 42 to enable full disengagement of the driving and driven clutch teeth by outward axial movement of the driven members.

The springs 58 and 59, which are adapted to normally maintain the clutch and cam teeth of the driven members in engagement with the corresponding teeth of the driving member and center cam member, but which yield upon overrunning to permit disengagement of said teeth, surround the inner ends of sleeve members 56 and 57 with their outer ends abutting against the externally splined portions 70 of said members and their inner ends thrusting against radially inwardly directed flanges 72 formed on spring retainers 60 and 61. The spring retainers are also provided with radially outwardly extending flanges 73 which engage inwardly projecting collars 74 formed integrally with cam rings 66, the flanges 73 being notched or splined correspondingly to splines 69 of the driven members to facilitate assembly of the mechanism.

The center cam member 50, which cooperates with the cam rings 66 of driven members 52 and 53 to produce disengagement of the driving and driven clutch teeth 63 and 64 at one side of the differential when the corresponding one of shafts 47 and 48 overruns the driving member 49, is only about half as wide in an axial direction as the driving member and has an outer peripheral surface of a diameter slightly less than that of the inner surface of said driving member. The center cam member is mounted inside the driving member centrally thereof, the only connection between the two elements being the split snap ring 51 which engages both a groove 75 in the inner surface of the driving member and a corresponding groove 76 in the outer surface of the cam member. With this construction, the center cam is free to rotate relatively to the driving member but is prevented from axial movement relative thereto by the snap ring. Insertion and removal of the snap ring may be accomplished in known manner by the use of a special tool which is so designed as to pull the normally spaced ends of the ring together sufficiently to reduce the diameter of the ring below that of the inner surface of the driving member, whereupon both the snap ring and the center cam member may be slid axially into and out of the driving member.

Assuming that both driven members 52 and 53 are fully engaged with the center driving and cam members 49 and 50, as shown in Fig. 2, and that the differential mechanism is installed in the interaxle transfer case 34 of Fig. 1 with the shafts 47 and 48 of the differential drivingly connected to the shafts 40 and 41, respectively, leading to the tandem axles 32 and 33, overrunning of either axle with respect to the other will automatically produce disengagement of the driving and driven clutch teeth at that side of the differential corresponding to the overrunning axle due to the outward axial movement of the associated driven clutch member produced by the cam teeth 67 and 68 when said member begins to rotate at a greater speed than the driving member. For example, should the forward tandem axle 32 pass over an obstruction while the wheels of the rear axle 33 are still driving on substantially level ground, the increased speed of rotation of the wheels of the forward axle will be reflected in a corresponding increase in velocity of the shafts 40 and 47, sleeve member 56 and driven member 52 relative to driving member 49. As the driven member 52 rotates ahead of the driving member, a movement made possible by the clearance between the driving and driven clutch teeth shown in the lower portion of Fig. 2, the cam teeth 67 on the cam ring 66 of driven member 52 begin to ride up on the inclined sides of cooperating cam teeth 68 on the left-hand side of center cam member 50, the latter member being prevented from partaking of the increased speed of rotation of the driven member 52 because the cam teeth on the right-hand side of cam member 50 remain fully engaged with the cooperating cam teeth on driven member 53 which continues to be driven by driving member 49 at the same speed as the latter. As the cam teeth of the driven member 52 ride up on the teeth of the center cam member, driven member 52 is moved axially outwardly against the force of spring 58, sliding on the splined portion 70 of its associated sleeve member 56, until said cam teeth are fully disengaged and are riding in end-to-end relationship, at which time the left-hand set of driving and driven clutch teeth 63 and 64 are also completely disengaged and in end-to-end relationship, as shown in Fig. 3.

Were it not for the presence of the holdout ring 54, the construction and operation of which are next to be described, continued overrunning of axle 32 would result in repeated engagement and disengagement of the clutch and cam teeth of driven member 52 with those of the driving and center cam members with the consequent disadvantages inherent in this type of operation, such as increased wear of the cam and clutch teeth, spring fatigue and noise. However, by incorporation in the differential of holdout rings of new and simple construction, the driven member on the overrunning side of the mechanism may be readily maintained in completely disengaged position as long as the overrunning continues, and will be automatically returned to the fully engaged position of Fig. 2 as soon as overrunning ceases.

Figure 4:
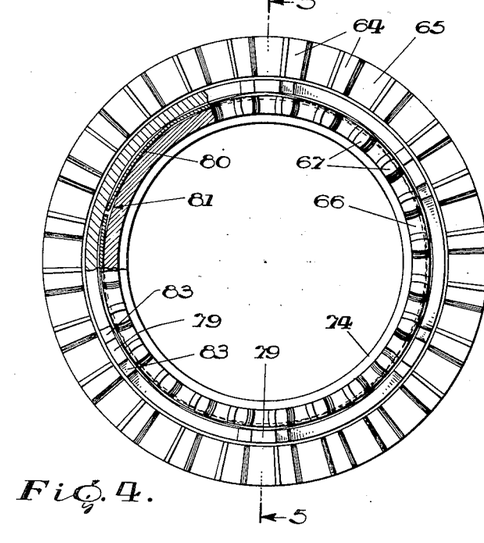
Fig. 4 is a face view, partially in section, of one of the driven clutch and cam members and associated holdout ring of the differential of Figs. 2 and 3.
Figure 5:
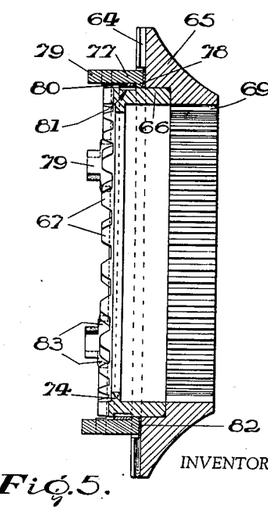
Fig. 5 is a sectional view taken substantially on the line 5—5 of Fig. 4.
Figure 14:
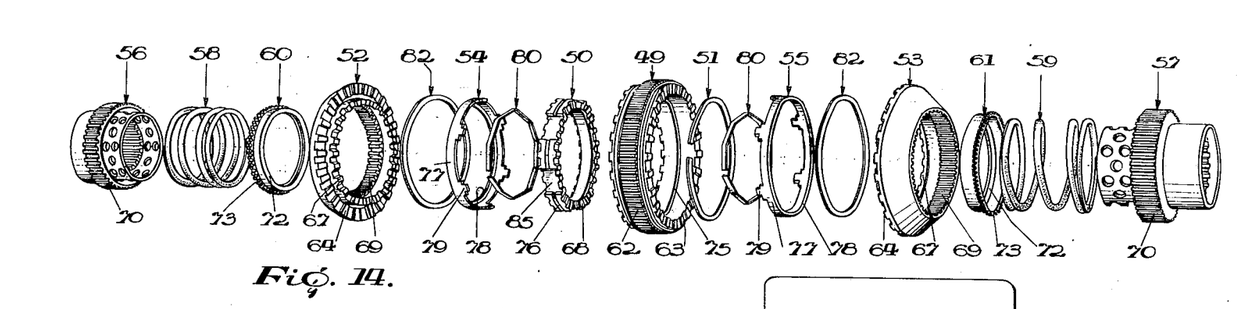
Fig. 14 is a perspective exploded view of the differential of Figs. 2 and 3 showing the various parts thereof separated from one another.

In the embodiment of the invention illustrated in Figs. 2-14, the holdout rings 54 and 55 are of the form perhaps best illustrated in the exploded view of Fig. 14, and are mounted on the driven clutch and cam members in the manner indicated best in Figs. 4 and 5. As shown, each ring comprises a circumferentially solid band 77 having at one edge a radially inwardly projecting flange 78 adapted to have a sliding fit on the outer peripheral surface of the cam ring portion 66 of the associated driven member, and at its opposite edge a plurality of circumferentially spaced, axially extending stepped lugs 79 adapted to cooperate with the center cam member in the manner hereinafter described for the purpose of maintaining the driven member on the overrunning side of the differential in declutched or disengaged position as long as the overrunning continues.

The holdout ring is maintained in position on the associated driven member by a friction spring 80 consisting of a flat strip of spring steel bent into polygonal form, said spring being interposed between the inner surface of the band 77 of the holdout ring adjacent the flange 78 and the outer surface of cam ring 66 with the corners or vertices of the spring contacting the holdout ring and the central portions of its straight sides contacting the cam ring. In order to prevent axial displacement of the holdout ring relative to the driven member, the outer surface of cam ring 66 is provided with a circumferential groove 81 of substantially the same width as spring 80 in which the central portions of the straight sides of the spring lie when the mechanism is assembled. With this construction, abutment of one edge of the spring against flange 78 and of the opposite edge against the opposing wall of groove 81 locks the holdout ring against axial movement with respect to the cam ring, while at the same time the holdout ring is capable of rotation relative to the cam ring against the frictional resistance created by the areas of contact between the spring and the two rings. In view of the fact that relative rotation takes place between the holdout ring and the associated driven member when the latter is overrunning, it is preferable to provide a wear-resisting thrust washer 82 between the axially outer edge of the holdout ring at which the flange 78 is formed and the adjacent portion of the inner side face of the clutch part 65 of the driven member lying radially inwardly of the clutch teeth 64 between the latter and the outer surface of cam ring 66.

The stepped lugs 79 of the holdout ring, six in number in the construction illustrated, are symmetrical in form, each having a pair of steps 83 located on opposite sides of the central portion of the lug which extends outwardly beyond the teeth 67 of cam ring 66. As indicated best in Figs. 5, 8 and 11, the surfaces of steps 83 which are perpendicular to the axis of the differential, hereinafter called the end surfaces for convenience, lie in a plane which preferably is slightly closer to the central plane of the differential than that of the ends or tops of the cam teeth 67; i. e., the steps 83 are preferably slightly higher than the cam teeth 67. As will be apparent from the subsequent description, this difference in height of the steps 83 and cam teeth 67 provides a small axial clearance between the disengaged cam and clutch teeth when overrunning occurs and thus avoids the wear and noise that would result were said teeth to have end-to-end contact with one another during overrunning. The corner of each step 83 is beveled down to the plane of the ends of the cam teeth, as indicated at 84, in order to insure the desired method of operation hereinafter described.

Figure 6:
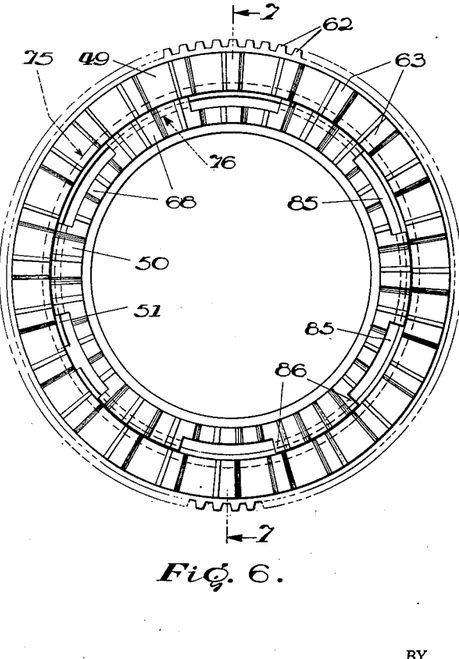
Fig. 6 is a face view of the driving member and associated center cam member of the differential of Figs. 2 and 3.
Figure 7:
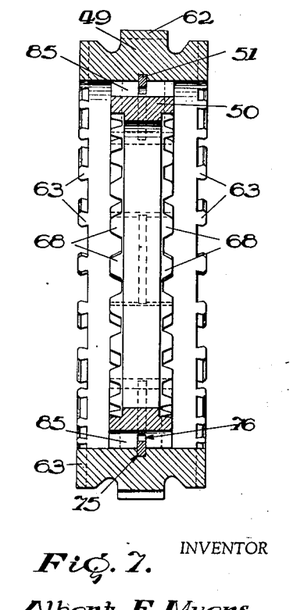
Fig. 7 is a sectional view taken substantially on the line 7—7 in Fig. 6.

Referring now particularly to Figs. 6 and 7 in comparison with Figs. 4 and 5, all of which are drawn to substantially the same scale, it will be seen that the center cam member 50 has a radial thickness approximately equal to the combined thickness of a holdout ring and the cam ring of the driven member on which it is mounted so that the radially inner portion of the center cam cooperates with the driven cam rings while the radially outer portion thereof cooperates with the holdout rings.

The radially inner portion of center cam member 50 is solid and the cam teeth 68 on the opposite faces thereof are equal in number and corresponding in form to the cam teeth 67 of the driven members. The radially outer portion of the center cam is, however, so machined as to form a plurality of slots 85 extending the full axial width of the cam member, said slots being equal in number to the stepped lugs 79 of the holdout rings and so cut that the end walls thereof are substantially coincident with the center planes of alternate cam teeth 68; i. e., each slot has a circumferential extent substantially equal to that of two complete cam teeth. Inasmuch as the circumferential extent of each of the stepped lugs, measured between the side surfaces of the steps, is slightly greater than that of one cam tooth, the lugs may be received in the slots with sufficient clearance to permit relative rotational movement between the center cam and the holdout rings when both sides of the differential mechanism are fully engaged through an arc slightly less than that subtended by one of the cam teeth. The axial length of the stepped lugs 79 is slightly less than the distance from the plane of the ends of one set of cam teeth 68 on the center cam to the adjacent side of the snap ring groove 76 so that, when the lugs occupy their axially innermost positions in the center cam slots 85, there is a slight clearance between the inner ends of the lugs and the sides of snap ring 51.

In the form of center cam member shown in Fig. 6 and related figures, the cam teeth 68 extend the full radial thickness of the cam ring in those portions thereof intermediate the slots 85. Inasmuch as the radially outer portions of said teeth perform no operative purpose, there being no corresponding cam teeth on the holdout rings, it is obvious that the side faces of the center cam member may be made smooth outwardly of the circumferential plane of the bottoms of slots 85, if desired. However, it has been found simpler and more economical from a machining standpoint to cut the cam teeth in the manner illustrated.

Figures 8, 9, 10:
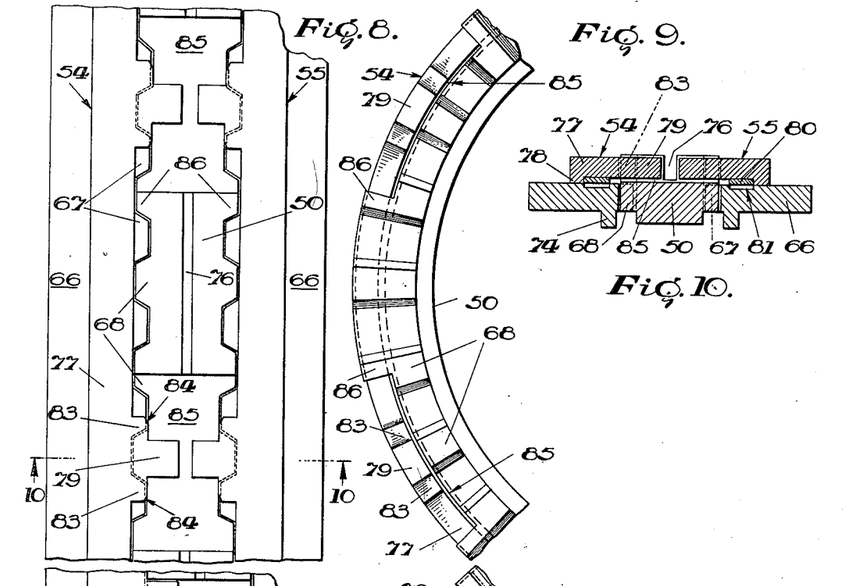
Fig. 8 is a fragmentary developed edge view of the holdout rings and cam elements of the differential of Figs. 2 and 3 showing the relative positions of said rings and elements when both driven members are fully engaged with the driving member as indicated in Fig. 2.
Fig. 9 is a fragmentary side view corresponding to Fig. 8, looking from the right in the latter figure with the right-hand holdout ring removed.
Fig. 10 is a sectional view taken substantially on line 10—10 in Fig. 8.
Figures 11, 12, 13:
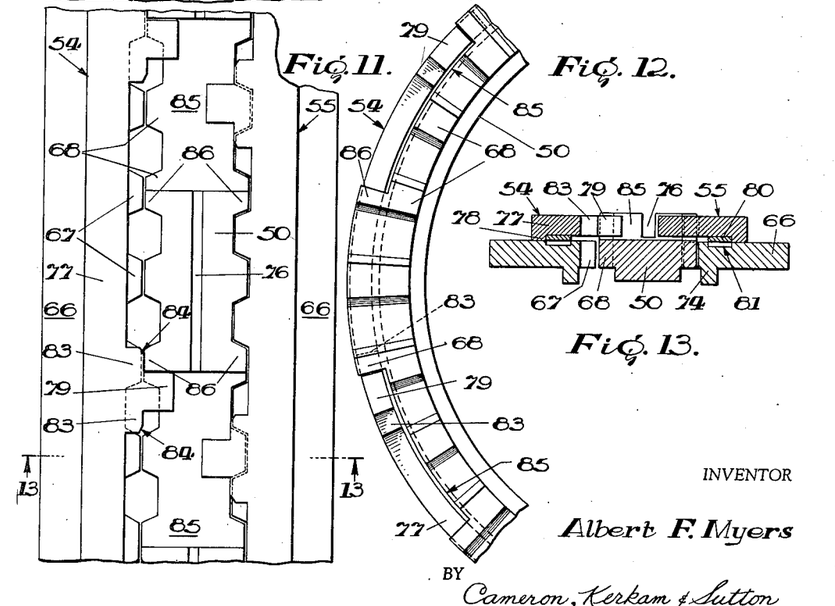
Figs. 11, 12 and 13 are views similar to Figs. 8, 9 and 10, respectively, but showing the relative positions of the parts when the axle connected to the left-hand driven member is overrunning the driving member as in Fig. 3.

The function and method of operation of the holdout rings 54 and 55 will appear most readily from a consideration of Figs. 8-13 of which Figs. 8-10 illustrate the relative positions of the holdout rings, the cam rings of the driven members and the center cam member when both driven members are fully engaged with the driving member, as in Fig. 2, while Figs. 11-13 indicate the relative positions of the same parts when the left-hand side of the differential is overrunning, as in Fig. 3.

In the fully engaged condition of Figs. 8-10, the cam teeth 67 of both driven members are fully meshed with the teeth 68 of center cam member 50 and the stepped lugs 79 of the holdout rings project their maximum distance into the slots 85 in the center cam. Since at this time there is no force exerted on the holdout rings, other than inertia, tending to produce relative rotation between them and their respective driven members, the holdout rings rotate with the driven members without relative movement therebetween due to the friction clutch effect of springs 80 and float, so to speak, in the slots 85.

If, however, as has been previously assumed, the left-hand side of the differential begins to overrun and the driven member 52 rotates at a greater velocity than the center driving member 49, the cam teeth 67 which are integral with said driven member ride up on the left-hand set of teeth 68 on the center cam and cause the overrunning driven member to move axially outwardly and disengage the left-hand set of clutch teeth 63 and 64. During the time that the cam teeth 67 are riding up the inclined sides of the center cam teeth 68 and during the initial period of the ensuing end-to-end sliding contact of said teeth, the holdout ring 54 on the overrunning driven member 52 continues to move with the latter forwardly with respect to the center cam member due to the frictional connection between the two elements established by the spring 80. As this forward movement continues, the advancing beveled corners 84 of the steps 83 on the holdout ring come into contact with and slide over the corners of the end walls of slots 85 and, spring 80 still being effective to resist relative rotation between the holdout ring and its driven member, move the driven member axially outwardly still further so as to completely separate the clutch and cam teeth of the driven member from the corresponding teeth of the driving member and center cam. The forward rotational movement of the holdout ring relative to the center cam then continues until the advancing side surfaces of the central portions of the stepped lugs 79 come into abutment with the ends of the slots 85, whereupon the holdout ring 54 becomes immobilized with respect to the center cam in the position shown in Figs. 11-13, with one step 83 of each lug resting on a half-tooth 86 of the cam ring. Thereafter the holdout ring 54 slips frictionally with respect to the driven member 52 as long as the latter rotates at a greater velocity than the center driving member 49.

When the overrunning of the left-hand side of the differential ceases, the speed of rotation of the driven member 52 decreases until it reaches and then tends to drop below that of the driving member and the rest of the elements then rotating with the latter, including the center cam. As soon as the speed of the driven member 52 becomes less than that of the driving member, i. e., when the latter begins to move ahead of the former, the friction clutch effect of the spring 80 again becomes operative to cause the holdout ring 54 to move with the cam ring 66 of driven member 52 since there is no longer any force opposing such movement other than the frictional contact between the end surfaces of the steps 83 of the holdout ring and the ends of the half-teeth 86 of the center cam. As the driven member 52 and holdout ring 54 drop rearwardly relative to the driving member and center cam, the steps 83 of the holdout ring move back off the half-teeth 86 of the cam ring until the beveled corners of the steps have cleared the corners of the end walls of the cam ring slots 85, at which time the driven member is free to return to the fully engaged position of Figs. 8-10 under the influence of spring 59 as soon as its cam teeth 67 come opposite the spaces between the cam teeth 68 of the center cam.

Due to the symmetrical construction of the stepped lugs of the holdout rings and the clearance provided between the side surfaces of the steps thereof and the end walls of the grooves in the center cam, the differential functions in the same manner irrespective of the direction of rotation of the driving member, i. e., whether the vehicle is driving ahead or backing. It is also evident that either side of the differential may overrun the driving member, but that neither side can underrun. In view of the fact that the holdout rings cooperate with the center cam which is freely rotatable with respect to the driving member and that there is no direct operative connection between the driving member and the holdout rings, torque reversals which may occur while one side of the differential is overrunning do not effect reengagement of the overrunning driven member as is the case with the structures disclosed in the above mentioned Knoblock application, Serial No. 87,280. Consequently, the mechanism of the present invention is less subject to excessive stresses than these prior devices and is better suited for use as a transfer case differential.

While the device of Figs. 2-14 is especially adapted to serve as the torque dividing element of an interaxle transfer case, such as that shown at 34 in Fig. 1, in an installation wherein both axles of the bogie are normally driven from the engine, the same mechanism may be employed, with a slight modification of the differential casing, as the power output element of a drop box, such as that shown at 37 in Fig. 1, for the purpose of providing a positive drive at all times to a rear axle or bogie while at the same time serving as an automatic overrunning clutch between a front steering axle and the engine.

Figure 15:
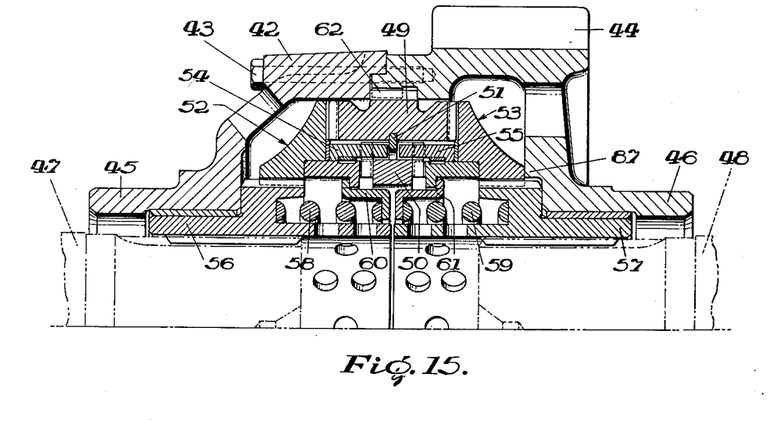
Fig. 15 is a half axial sectional view similar to Fig. 3 showing a modified form of differential casing which positively prevents disengagement of the right-hand driven clutch member and thus adapts the differential for use in the forward transfer case or drop box of the vehicle shown in Fig. 1 or in similar installations where a positive drive is required at all times to a rear axle or bogie while a forward axle or bogie may overrun.

For example, the structure of Fig. 15 is identical with that of Figs. 2-14 except that the side wall of the right-hand half of the differential casing 42 adjacent the boss 46 is thickened so as to provide an abutment 87 which engages the outer edge of the right-hand driven member 53 and positively prevents outward axial movement of said member relative to the associated sleeve member 57. With this construction, it is impossible to disengage the right-hand side of the differential and there is always provided a positive drive from the driving member 49 through the driven member 53 and sleeve 57 to the shaft 48 which, were the mechanism to be installed in the drop box 37, would be drivingly connected to the propeller shaft 39 leading to the rear axles 32 and 33. At the same time, the left-hand driven member 52 may be disengaged whenever the associated shaft 47 rotates at a greater velocity than the driving member 49 and will be maintained in disengaged position by the holdout ring 54 as long as the overrunning continues, in the same manner as described above in connection with the embodiment of Figs. 2–14.

As previously indicated, when the differential is used in the drop box 37, the shaft 47 is connected to the relatively short propeller shaft 38 leading to the front axle 31 and the latter may be so designed that the wheels thereof normally drive the shaft 38 at a somewhat greater velocity than said shaft would be driven were it positively connected to the driving member of the differential. The result is that the left-hand side of the differential normally overruns the driving member with the driven member 52 in disengaged position, but automatically becomes engaged so as to positively drive the front axle 31 whenever the velocity of the driving member 49 increases relative to and tends to become greater than that of the driven member 52, a condition which would occur, for example, when the wheels of the rear tandem axles 32 and 33 begin to loose traction. The same construction may be employed in installations where the front axle is also normally driven from the engine but must overrun when the vehicle makes a turn.

Although it is true that, in the construction of Fig. 15, the right-hand holdout ring 55 and the right-hand set of cam teeth 67, 68 do not perform their usual functions when the mechanism is in use, and might therefore be eliminated, there are certain advantages which inhere in the use of a symmetrical design like that of Figs. 2–14. In the first place, since both sides of the differential are alike, there is no danger of installing it incorrectly in the differential case as would be true were the two sides of the differential of different construction. Secondly, the symmetrical design is more economical to service since the right-hand and left-hand driven members, holdout rings, sleeves, springs and spring retainers are interchangeable. A further advantage resides in the fact that, when both sides of the differential are of the same construction, the device is usable in either the drop box 37 or the interaxle transfer case 34.

Figure 16:
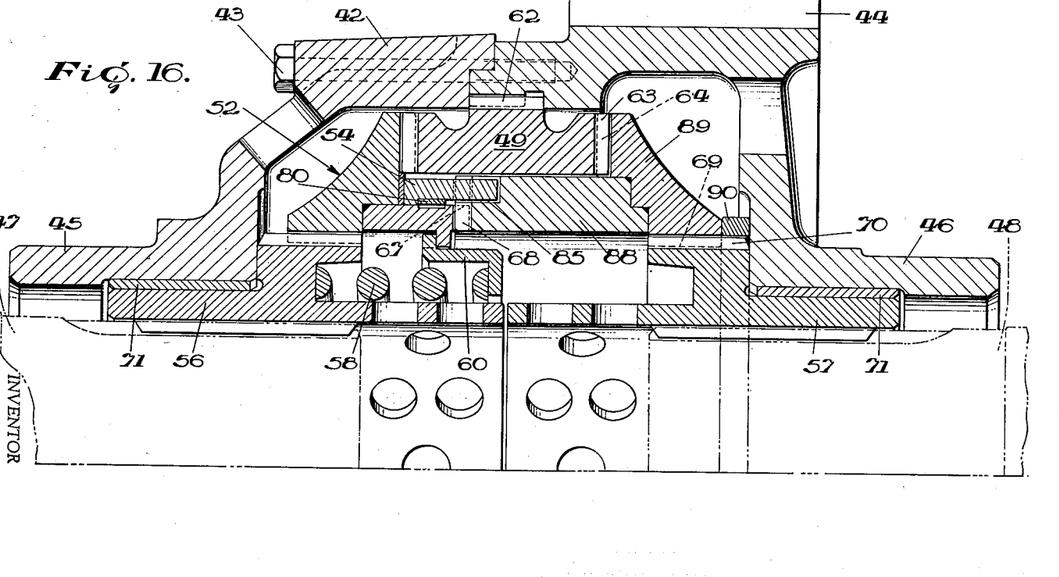
Fig. 16 is a half axial section of another form of differential adapted for the same purpose as that shown in Fig. 15.

Under certain circumstances, however, it may be desirable to eliminate the unnecessary parts and provide a device of unsymmetrical design for use as the power output element of a drop box associated with a drivable front axle which is adapted to overrun under certain conditions and a continuously driving rear axle or bogie. One form of mechanism especially adapted for such purposes is shown in Fig. 16.

As there illustrated, the mechanism comprises a casing 42, center driving member 49, left-hand driving clutch and cam member 52 and associated holdout ring 54, sleeve members 56 and 57, shafts 47 and 48, and left-hand compression spring 58 and spring retainer 60 which are identical in structure and method of operation with the corresponding elements of Figs. 2–14, except that the center driving member 49 need not be provided with the snap ring groove shown at 75 in the first embodiment. At the right-hand side of the mechanism, the holdout ring, compression spring and spring retainer have been omitted and the center cam member and cam ring of the driven member have been merged in a cam member 88 which may be either welded to or formed integrally with a driven clutch member 89 of substantially the same construction as the clutch portion 65 of driven member 53 of Figs. 2–14. Driven clutch member 89 is splined to sleeve member 57 just as in the previously described embodiments, but is positively prevented from outward axial movement relative to the driving member 49 by means of a blocking ring 90 which is interposed between the axially outer edge of said driven member and the adjacent wall of the casing 42, said ring resting on the outer ends of the splines on sleeve member 57. In the latter connection, it will be obvious that a similar ring might be used for the same purpose in the mechanism of Fig. 15 instead of thickening the wall of casing 42 as shown at 87 in the latter figure.

The left side of cam member 88 is provided with cam teeth 68 and slots 85 of the same character, and which cooperate with the cam teeth 67 of the left-hand driven member 52 and the holdout ring 54 in the same manner, as the corresponding parts of the structure of Figs. 2–14. With this arrangement, the left-hand driven member 52 will move axially outwardly to disengage the driving member 49 and will be maintained in disengaged position as long as the shaft 47 overruns the driving member, but the right-hand driven member 89 remains in engagement with the driving member at all times so as to continuously provide a positive drive to the shaft 48.

Referring now to Figs. 17–21, there is shown therein another form of differential mechanism embodying the invention which, as illustrated, is adapted for the same purposes as the device of Figs. 2–14. In this modification, all of the parts are of substantially the same construction, and function in substantially the same manner, as those of Figs. 2–14 with the exception of the center cam member and the holdout rings. Consequently, it is believed unnecessary to describe in detail the casing 42, center driving member 49, driven members 52 and 53 including their cam rings 66, sleeve members 56 and 57, strings 58 and 59 and spring retainers 60 and 61.

Figure 17:
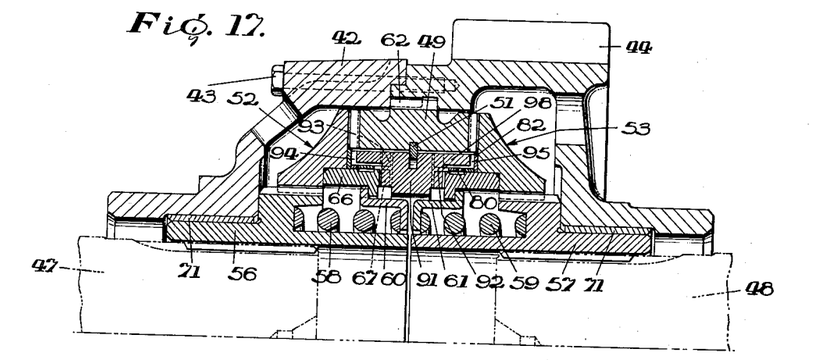
Figs. 17-21 are views similar to Figs. 3-7 of still another differential embodying the invention.
Figure 18:
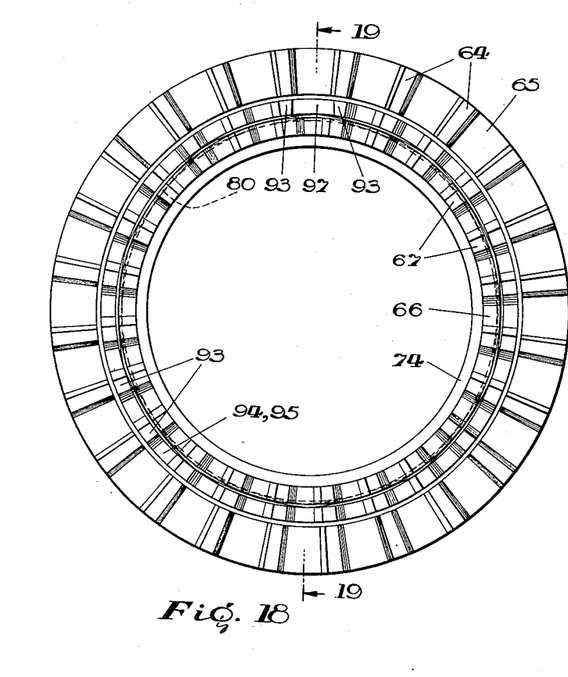

The modified center cam member 91 of Figs. 17–21 is rotatably mounted within the driving member 49 by means of a snap ring 51 similarly to the center cam of the first embodiment, but differs from the latter in that all of the cam teeth 92 which are formed on the opposite side faces thereof, with one exception, extend the full radial thickness of the cam member and are adapted to cooperate, not only with the cam teeth 67 of the driven members, but also with similar cam teeth 93 formed on the axially inner edges of holdout rings 94 and 95. Each of the holdout rings has a radially inwardly projecting flange 96 at its outer edge and is rotatably mounted on the cam ring 66 of the associated driven member by means of a friction spring 80 and thrust washer 82, similarly to the holdout rings of Figs. 2-14, 15 and 16. Instead of being circumferentially solid, however, each of rings 94 and 95 is split so as to provide a slot or gap 97 having a circumferential extent substantially equal to the distance between the adjacent corners of two of its adjacent cam teeth 93. The cam teeth 93 of the holdout rings are equal in number to, and of the same form as, the teeth 67 of the driven members and are normally aligned with the latter and in mesh with the teeth 92 of center cam 91 when both sides of the differential are fully engaged, as indicated in Fig. 17. The holdout rings 94 and 95 are thus similar in construction to those embodied in the structure disclosed in Figs. 1-11 of the previously mentioned Knoblock application Serial No. 87,280.

Figure 20:
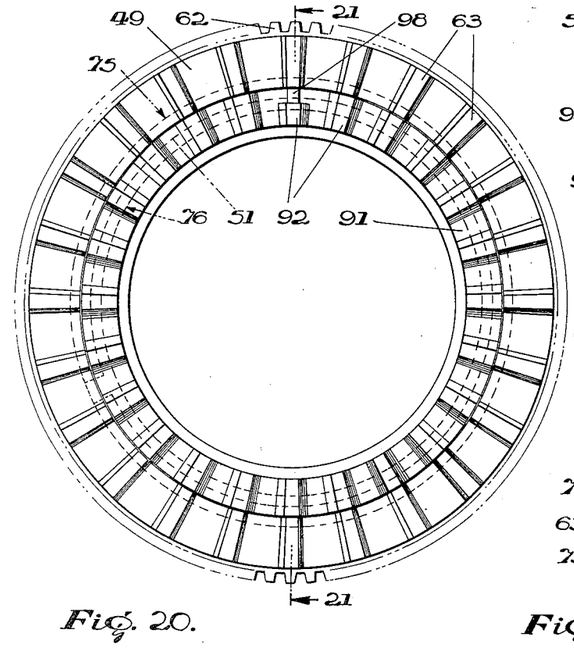
Figure 21:
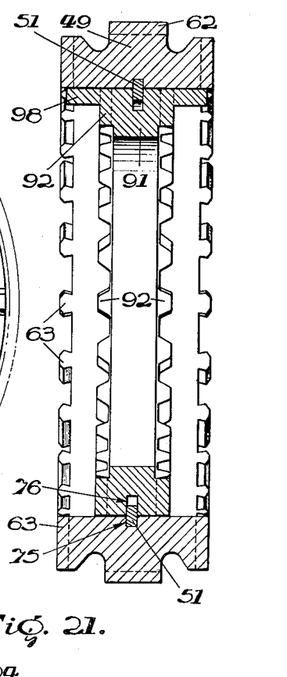
Figure 22:
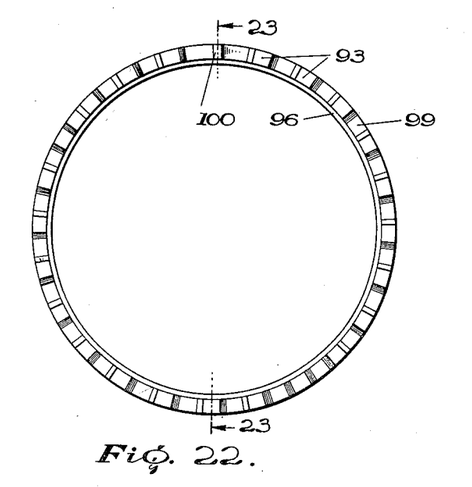
Figure 23:
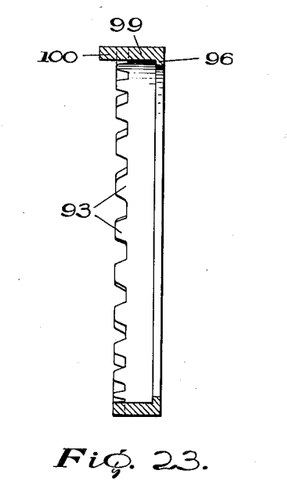

As shown best in Figs. 20 and 21, one of the teeth 92 on each side of center cam member 91 has a radial extent of only about half that of the other teeth, the radially outer portion of said tooth being replaced by an elongated lug or key 98 which projects axially outwardly almost to the plane of the ends of the clutch teeth 63 on the corresponding side of the driving member 49 and extends into the slot 97 of the adjacent holdout ring. Since the lug 98 is slightly narrower in a circumferential direction than the portion of the cam tooth 92 which it replaces, it fits into the slot 97 with a clearance on each side closely approximating the circumferential width of the end of one of the cam teeth 93 of the holdout ring.

With this construction, should either of the driven members begin to overrun the driving member, disengagement of the overrunning member will be effected by the cooperative action of its cam teeth 67 and the radially inner portions of cam teeth 92 of the center cam in the same manner as in the device of Figs. 2-14. As the overrunning driven member rotates ahead of the driving member and moves axially outwardly with respect thereto due to the action of the cam teeth, the associated holdout ring moves with the driven member both circumferentially and outwardly, being frictionally clutched thereto by the spring 80, until the end of the holdout ring defining one end of the slot 97 comes into contact with the lug 98 of the center cam, at which time the cam teeth 93 of the holdout ring and driven cam teeth 67 are in end-to-end relationship with the teeth 92 of the center cam. Abutment of the end of the holdout ring against the lug 98 prevents any further rotational advance of the holdout ring relative to the center cam. Thereafter, as long as the overrunning continues, the driven member rotates ahead of the holdout ring overcoming the frictional resistance of spring 80 and the driven cam teeth move past the teeth of the center cam while the teeth 93 of the holdout ring maintain the driven member in disengaged or declutched position by virtue of their end-to-end contact with the teeth of the center cam.

Figure 19:
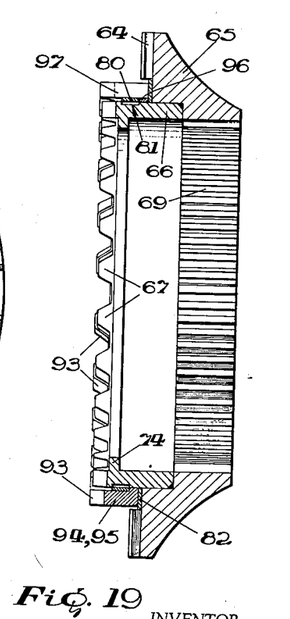

If desired, wear of the driven cam teeth 67 and the cooperating portions of center cam teeth 92 may be minimized by making the teeth 93 of the holdout ring slightly higher than teeth 67, as indicated in Fig. 19, so that the latter do not contact with the center cam teeth during overrunning. If, however, the matter of wear is not particularly important, the teeth of the holdout ring may be of the same height as, or even slightly lower than, those of the driven member. In the latter event, the thrust of the compression spring tending to urge the disengaged driven member back into engagement with the driving member is transmitted to the ends of the center cam teeth alternately through the driven member cam teeth 67 and the teeth 93 of the holdout ring, similarly to the action of the above mentioned Knoblock structure.

Reengagement of the disengaged driven member is brought about automatically when the overrunning ceases and the driving member begins to rotate ahead of the driven member by virtue of the fact that, as soon as the lug 98 moves forwardly in slot 97 out of contact with the end of the holdout ring, the latter again becomes clutched to the driven member through the friction spring 80. Should the teeth of the holdout ring then happen to be aligned with the cam teeth 67 of the driven member, remeshing will occur as soon as said aligned teeth come opposite the spaces between the cam teeth 92 of the center cam. If, however, the teeth of the holdout ring and driven member are not aligned when the driving member and center cam begin to rotate ahead of the declutched driven member, alignment will be brought about when the lug 98 has moved from one end of the slot 97 to the other, comes into contact with the other end of the holdout ring and displaces the latter with respect to the driven member sufficiently to bring the teeth into line. Reengagement of the driven member with the driving member will then occur as soon as the realigned teeth come opposite the spaces between the center cam teeth.

Figure 24:
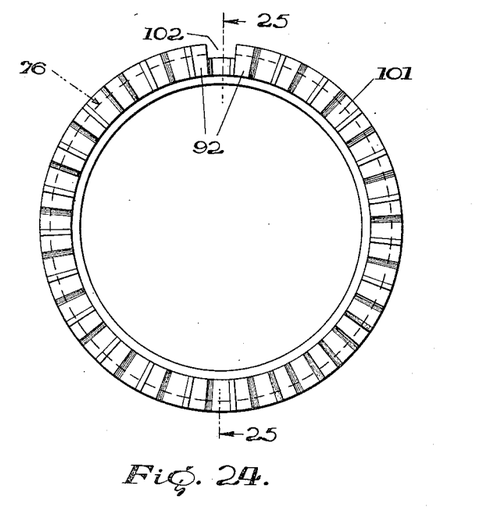
Figs. 24 and 25 are similar views of the cooperating center cam.
Figure 25:
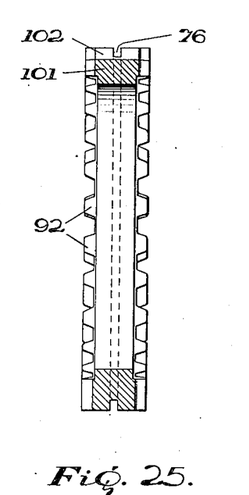

Figs. 22-25 show modified forms of holdout ring and center cam which may be used interchangeably with those of Figs. 17-21. The holdout ring 99 of Figs. 22 and 23 has a flange 96 at one edge and cam teeth 93 at the other similar to the correspondingly numbered elements of Figs. 17-19, but instead of being split or slotted, is circumferentially solid. One of the cam teeth, however, is replaced by an elongated lug or key 100 of a width slightly less than that of the end of the tooth which it replaces, said lug extending beyond the plane of the ends of the other teeth 93 for a distance slightly greater than the height of said teeth. The cooperating center cam member 101 of Figs. 24 and 25 is provided with cam teeth 92 like those of Figs. 20 and 21, but omits the lug 98 of the latter figures and has in lieu thereof a transversely extending slot 102 of a radial depth slightly greater than that of lug 100 of holdout ring 99 and a circumferential width equivalent to the distance between the adjacent edges of the ends of two of the adjacent teeth 92.

The holdout ring 99 and center cam member 101 of Figs. 22-25 are adapted to be mounted on the driven members and the center driving member, respectively, of the differential in the same manner as the corresponding elements of Figs. 17-21 with the lugs 100 of the holdout rings extending into the opposite ends of slot 102 of the center cam, and their method of operation is the same as in the next preceding embodiment in all respects other than that occasioned by the reversal in position of the lug and slot.

Figure 26:
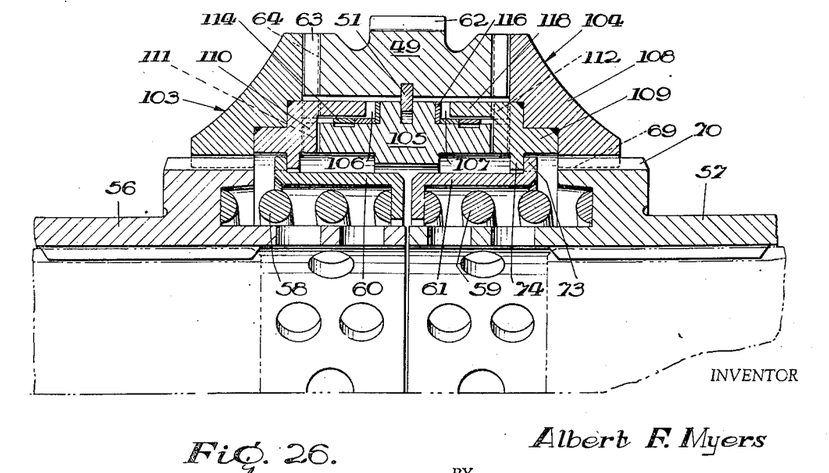
Figs. 26-30 are views similar to Figs. 17-21 of another differential constructed in accordance with the invention.

The differential illustrated in Figs. 26-30 is still another structural exemplification of the invention which differs from those hereinbefore described primarily in that the holdout rings are mounted on the center cam member instead of on the driven members. As shown in Fig. 26, this mechanism comprises a center driving member 49, sleeve members 56 and 57, springs 58 and 59 and spring retainers 60 and 61 of substantially the same construction as the correspondingly numbered elements of the other embodiments. The driven members 103 and 104, the center cam member 105 and the holdout rings 106 and 107 are, however, of modified form, best illustrated in Figs. 27–30.

Figure 27:
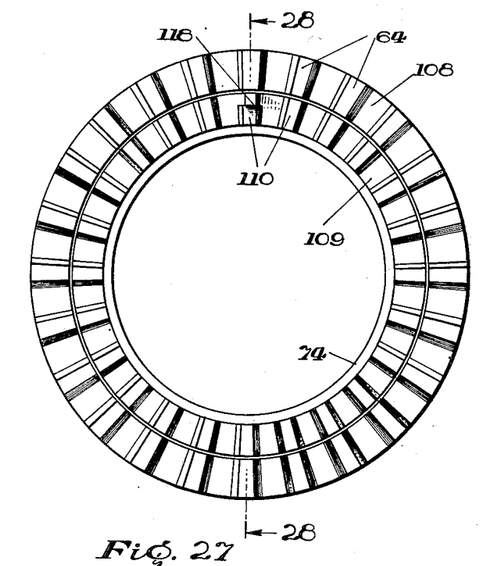
Figure 28:
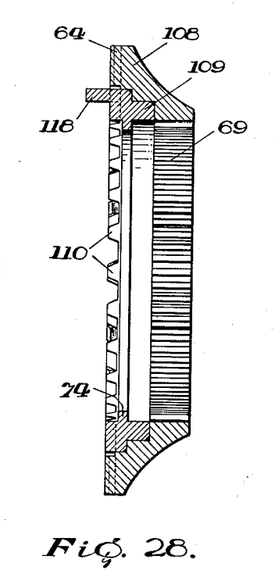
Figure 29:
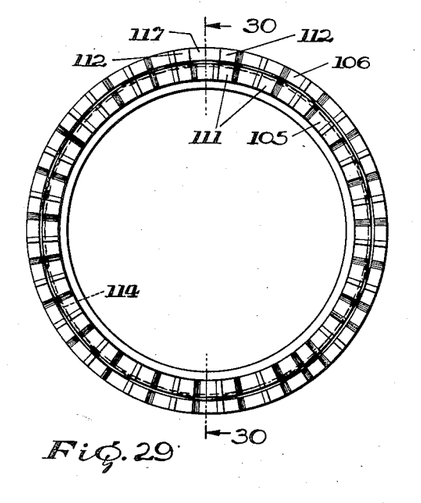

Each of the driven members 103 and 104 is of the construction shown in Figs. 27 and 28 and comprises a clutch portion 108 having driven clutch teeth 64 and splines 69 adapted to cooperate with the clutch teeth 63 of the driving member 49 and the splined portion 70 of sleeve member 56 or 57, respectively, and a cam ring 109 which may be either welded to or formed integrally with the clutch portion 108 and is provided at its inner face with cam teeth 110 preferably equal in number to and aligned with the clutch teeth 64. The cam ring 109 also carries an inwardly projecting collar 74 which is adapted to be engaged by the outwardly turned flange 73 of the associated spring retainer 60 or 61 (Fig. 26) for the purpose of transmitting the thrust of the compression spring 58 or 59 to the driven member as in the previously described embodiments. All of cam teeth 110, with one exception hereinafter described, extend the full radial thickness of the cam ring 109 and are adapted to cooperate both with cam teeth 111 of center cam member 105 and with similar cam teeth 112 formed on the axially outer edges of holdout rings 106 and 107.

Figure 30:
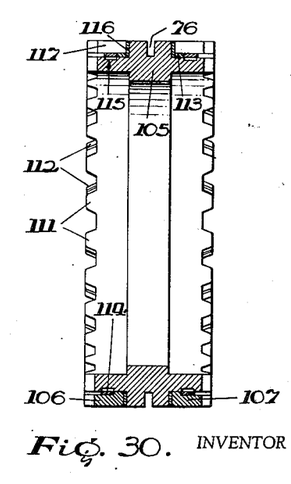

As indicated in Fig. 26, the center cam member 105 has an axial width substantially equal to that of driving member 49 and is mounted centrally within the latter in freely rotatable relationship by means of a snap ring 51 seating in grooves 75 and 76 formed in the driving member and center cam, respectively. The cam teeth 111 formed on the opposite sides of the center cam lie in substantially the same radial planes as the clutch teeth 63 of driving member 49, but do not extend the full radial thickness of cam member 105 because, as shown in Fig. 30, the radially outer portion of the latter is cut away at both sides so as to form annular recesses or grooves in which the holdout rings 106 and 107 are mounted. Each of the holdout rings is provided with a radially inwardly projecting flange 113 having a sliding fit on one of the cutaway portions of the cam member which cooperates with a polygonal friction spring 114 partially seated in a groove 115 for the purpose of preventing axial displacement of the holdout ring with respect to the center cam while still permitting relative rotation between the two elements, comparably to the holdout ring mountings of the embodiments previously described. A thrust washer 116 may be interposed between the axially inner edge of each holdout ring and the adjacent surface of the center cam to minimize wear due to relative rotation of the two elements.

The cam teeth 112 of the holdout rings are equal in number to, and of the same form as, the teeth 111 of the center cam and are normally aligned with the latter and in mesh with the teeth 110 of the driven members when both sides of the differential are fully engaged, as indicated in Fig. 26. Each of the holdout rings is split so as to provide a slot or gap 117 having a circumferential extent substantially equal to the distance between the adjacent corners of two of its adjacent cam teeth 112. As shown in Figs. 27 and 28, one of the teeth 110 of each driven member has a radial extent of only about half that of the other teeth, the radially outer portion of said tooth being replaced by an elongated lug or key 118 which projects axially inwardly beyond the plane of the ends of the other teeth 110 for a distance slightly greater than the height of said teeth and extends into the slot 117 of the adjacent holdout ring. The lug 118 is narrower in a circumferential direction than the portion of the cam tooth 110 which it replaces and fits into the slot 117 with a clearance closely approximating the circumferential width of the end of one of the cam teeth 112 of the holdout ring.

The method of operation of the mechanism of Figs. 26–30 is similar to that of Figs. 17–21 except that the holdout rings 106 and 107 are frictionally clutched to the center cam member 105 instead of to the driven members 103 and 104, and their teeth are shifted into end-to-end relationship with the radially outer portions of cam teeth 110 of the driven members by the lugs 118 of the latter when overrunning occurs instead of being actuated by and cooperating with the lugs and cam teeth on the center cam as in the previous embodiment.

If desired, the relative positions of the slots 117 and lugs 118 of the embodiment of Figs. 26–30 could be reversed similarly to the structure of Figs. 22–25; i. e., the slots could be formed in the cam rings 109 of the driven members and the lugs made integral with the holdout rings 106 and 107, without any fundamental change in the method of operation of the device.

There is thus provided by the present invention an improved form of differential mechanism of the overrunning clutch type characterized by the inclusion of means for maintaining one side of the mechanism in disengaged or declutched position as long as the driven member at the disengaged side overruns the driving member, which means are controlled by the relative velocities of the driven member and a cooperating center cam member freely rotatable relative to the driving member, and without any direct connection between said means and the driving member. While devices embodying the invention may be used for a variety of purposes, they are particularly adapted for employment as transfer case differentials in motor vehicles wherein one axle or bogie is designed to normally overrun another axle or another bogie which is continuously driven from the engine, but the overrunning axle or bogie is also adapted to be positively driven when the wheels of the other lose traction. Due to their novel construction, the mechanisms of the invention are rugged and dependable in operation, relatively economical to manufacture and service, and free from the defects of other devices heretofore proposed for the same general purposes.

While several specifically different forms of differential embodying the invention have been described and illustrated in the accompanying drawings, it will be obvious that the invention is not limited to the particular structures shown, but is capable of a variety of mechanical embodiments, and that various changes, which will now suggest themselves to those skilled in the art, may be made in the form, details of construction and arrangement of the parts without departing from the inventive concept. Reference is therefore to be had to the appended claims for a definition of the limits of the invention.

What is claimed is:

1. A differential mechanism of the class described comprising a driving member, a pair of driven members, cooperating clutch elements on said driving and driven members for transmitting torque from said driving member to said driven members, at least one of said driven members being axially movable relative to said driving member, means including a cam member mounted within said driving member for causing the axial separation of said axially movable driven member and the driving member and disengagement of the cooperating clutch elements thereof when the velocity of said driven member exceeds that of said driving member, and a holdout ring rotatably mounted on one of said cam and axially movable driven members for maintaining said axial separation so long as the velocity of said driven member exceeds that of said driving member, said holdout ring and the other of said cam and axially movable driven members being so constructed and arranged that said ring is free to rotate a limited amount relative to said other member, said other member including means for immobilizing said ring with respect thereto after said limited movement has taken place, whereupon the member on which said holdout ring is mounted rotates relatively to said ring so long as the velocity of the axially movable driven member exceeds that of the driving member.

2. A differential mechanism according to claim 1 wherein the holdout ring is rotatably mounted on the axially movable driven member and is provided with a circumferentially extending slot therein, and the cam member includes an axially projecting lug extending into said slot and having a circumferential dimension less than that of said slot.

3. A differential mechanism according to claim 1 wherein the holdout ring is rotatably mounted on the axially movable driven member and is provided with an axially projecting lug, and the cam member is provided with a circumferentially extending slot of greater circumferential extent than said lug into which said lug extends.

4. A differential mechanism according to claim 1 wherein the holdout ring is rotatably mounted on the cam member and is provided with a circumferentially extending slot therein, and the axially movable driven member is provided with an axially projecting lug extending into said slot and having a circumferential dimension less than that of said slot.

5. A differential mechanism of the class described comprising a driving member, a pair of driven members, cooperating clutch elements on said driving and driven members for transmitting torque from said driving member to said driven members, one of said driven members being axially movable relative to said driving member, means for preventing axial movement of the other driven member relative to said driving member so as to maintain a positive driving connection to said other driven member at all times, means including a cam member mounted within said driving member in non-rotatable relationship to said last named driven member for causing the axial separation of said axially movable driven member and the driving member and disengagement of the cooperating clutch elements thereof when the velocity of said driven member exceeds that of said driving member, and a holdout ring rotatably mounted on one of said cam and axially movable driven members for maintaining said axial separation so long as the velocity of said driven member exceeds that of said driving member, said holdout ring and the other of said cam and axially movable driven members being so constructed and arranged that said ring is free to rotate a limited amount relative to said other member said other member including means for immobilizing said ring with respect thereto after said limited movement has taken place, whereupon the member on which said holdout ring is mounted rotates relatively to said ring so long as the velocity of the axially movable driven member exceeds that of the driving member.

6. A differential mechanism according to claim 5 wherein the cam member forms a part of the axially immovable driven member and the holdout ring is rotatably mounted on the axially movable driven member.

7. In a transfer case differential for a pair of opposed axle driving shafts of the type embodying two sets of meshing driving and driven clutch elements, the combination of a cam member rotatable but axially immovable with respect to the driving clutch elements and having cam elements operative to disengage one set of driving and driven clutch elements by axial movement in one direction of the driven clutch element relative to the associated driving clutch element when the associated shaft overruns the driving clutch element, a holdout ring carried by said axially movable driven clutch element which, upon overrunning, initially moves both axially and rotatably with said element relative to the associated driving clutch element and the cam member, surfaces on said ring which, during said initial movement, come into contact with cooperating surfaces on said cam member and prevent axial movement of said driven clutch element in the opposite direction to effect reengagement with the driving clutch element, and means forming part of said cam member operable when said surfaces come into contact for preventing further movement of said ring relative to said cam member as long as the overrunning continues, said ring being so mounted on said driven clutch element as to permit the latter to rotate relative to said ring as long as the latter is immobilized with respect to said cam member.

8. A transfer case differential according to claim 7 including means for positively preventing disengagement of the other set of driving and driven clutch elements.

9. A transfer case differential according to claim 7 including a casing for said driving and driven clutch elements having a portion abutting one of said driven elements and preventing disengagement thereof from the associated driving clutch element.

10. A transfer case differential mechanism comprising a driving member having clutch teeth formed on the opposite sides thereof, a pair of axially movable driven members having clutch teeth adapted for engagement with and disengagement from the clutch teeth of said driving member, a cam member rotatably mounted with respect to said driving member, cam elements on said driven members and cooperating with said cam member for disengaging either driven member from said driving member when said driven member rotates at a greater velocity than said driving member, a holdout ring mounted on each of said driven members for axial movement therewith and rotation relative thereto, projections on said holdout rings extending toward said cam member, recesses in said cam member adapted to receive said projections when the clutch teeth of said driving and driven members are in engagement, surfaces on said cam member adjacent said recesses which, when engaged by said projections, hold the driven members out of engagement with the driving member, the projections of said holdout rings being moved into engagement with said driven surfaces when said driven members overrun and are disengaged from said driving member, and means forming part of said cam member for immobilizing said holdout rings with respect thereto with the projections of said rings in engagement with the surfaces of said cam member as long as the overrunning continues.

11. A transfer case differential mechanism according to claim 10 including means for preventing axial movement of one of said driven members relative to the driving member.

12. A transfer case differential mechanism according to claim 10 including a casing for said driving and driven members having walls spaced from the outer edges of said driven members, and a blocking member interposed between one of said driven members and the adjacent wall of said casing for preventing axial movement of said driven member relative to the driving member.

13. In a differential mechanism of the type embodying a driving member having clutch teeth formed on the opposite sides thereof, a pair of driven members axially movable against spring pressure relative to said driving member and having clutch teeth engageable with those of said driving member and a cam member cooperating with cam elements carried by said driven members for disengaging either driven member from the driving member when said driven member overruns the driving member, a holdout ring for each of said driven members adapted to maintain the latter in disengaged position as long as the overrunning continues, said holdout ring being rotatably mounted on one of said cam and driven members and having axially extending projections receivable in depressions in the other of said members when the driven member is engaged with the driving member, axially raised surfaces on said other member adjacent said depressions against which said projections abut when the driven member is disengaged from the driving member, and means forming a part of said other member for preventing rotation relative thereto of said holdout ring when said projections are in abutment with said axially raised surfaces as long as said driven member overruns the driving member.

14. A differential mechanism according to claim 13 wherein the holdout ring is rotatably mounted on, but incapable of axial movement relative to, the driven member, and said cam member and holdout ring are provided, respectively, with a plurality of circumferentially spaced slots and a plurality of stepped lugs which extend into said slots, the steps on said lugs abutting against the side surfaces of said cam member adjacent said slots when the driven member is disengaged from the driving member.

15. A differential mechanism according to claim 13 wherein the holdout ring is rotatably mounted on the center cam and the driven member is provided with depressions in the form of circumferentially spaced slots into which the projections of said holdout ring extend.

16. In a differential mechanism of the type embodying a driving member having clutch teeth formed on the opposite sides thereof, a pair of driven members axially movable against spring pressure relative to said driving member and having clutch teeth engageable with those of said driving member and a cam member cooperating with cam elements carried by said driven members for disengaging either driven member from the driving member when said driven member overruns the driving member, a holdout ring for each of said driven members adapted to maintain the latter in disengaged position as long as the overrunning continues, said holdout ring being rotatably mounted on, but incapable of axial movement relative to, said driven member, an axially extending projection formed on one of said cam member and holdout ring, a recess in the other of said cam member and holdout ring into which said projection extends, and axially raised surfaces on each side of said projection and said recess adapted to abut one another and hold the driven member in disengaged position when relative rotation takes place between said driven member and said cam member upon overrunning, said lug and recess cooperating to prevent relative rotation between said cam member and holdout ring after said axially raised surfaces have come into abutment as long as the overrunning continues.

17. A differential mechanism of the class described comprising a driving member, a pair of driven members, cooperating clutch elements on said driving and driven members for transmitting torque from said driving member to said driven members, means including a cam member rotatably mounted on said driving member for causing the axial separation of one of said driven members and the driving member when the velocity of said driven member exceeds that of said driving member, a holdout ring rotatably mounted on said driven member having axially extending projections which, upon said axial separation of said driven and driving members, come into abutment with cooperating portions of said cam member and maintain said axial separation so long as the velocity of said driven member exceeds that of said driving member, and means for frictionally clutching said holdout ring to the driven member on which it is mounted, said means normally resisting relative rotation between said ring and said driven member but yielding to permit such relative rotation when the driven member is maintained in axially separated position by said ring.

18. A differential mechanism according to claim 17 wherein the driven member and holdout ring are so constructed as to provide an annular space therebetween, and which includes a friction spring housed in said space and frictionally engaging circumferentially spaced portions of both said ring and said driven member.

19. A differential mechanism according to claim 18 including a flange on said holdout ring engaging one side of said spring for preventing axial movement of said ring relative to the driven member on which it is mounted.

20. A transfer case differential mechanism comprising a driving member having clutch teeth formed on the opposite sides thereof, a pair of driven members axially movable relative to said driving member having clutch teeth engageable with those of said driving member, spring means normally urging said driven members into engagement with said driving member, means including a cam member mounted within said driving member for moving either driven member axially against the pressure of said spring means and disengaging the clutch teeth of said driven member from those of the driving member when the velocity of said driven member exceeds that of said driving member, said cam member being freely rotatable but incapable of axial movement relative to said driving member, a holdout ring for each of said driven members adapted to maintain the latter in disengaged position as long as the overrunning continues, each of said holdout rings being rotatably mounted on the associated driven member and having a plurality of circumferentially spaced stepped lugs extending axially therefrom toward said cam member, said cam member having a plurality of circumferentially spaced slots formed therein into which said lugs extend, the circumferential dimension of each of said lugs being less than that of the cooperating slot, means frictionally clutching each holdout ring to the driven member on which it is mounted, said means normally resisting relative rotation between said ring and said driven member so that said ring moves both axially and rotationally with the driven member when the latter begins to overrun the driving member, the steps on said lugs being so formed that the initial axial and rotational movement of said ring with said driven member brings said steps into abutment with the side surfaces of said cam member at one end of each of said slots and brings the central portions of said lugs into engagement with the portions of said cam member defining the ends of said slots, said frictional clutching means yielding to permit relative rotation between said holdout ring and the associated driven member when said lugs come into engagement with the ends of the slots, whereby said lugs maintain said driven member in disengaged position as long as the overruning continues.

21. A transfer case differential mechanism according to claim 20 wherein each of said driven members is provided with cam teeth cooperating with said cam member for initially disengaging the driven member from the driving member, and wherein the steps of said stepped lugs are slightly higher than said cam teeth.

22. In an automotive vehicle of the type embodying at least two drivable axles the first of which is adapted to be positively driven at all times while the second normally overruns and is positively driven only when the wheels of said first axle lose traction, a differential mechanism for transmitting driving torque to said axles comprising a driving member, a first driven member connected to said first axle, means for maintaining said first driven member in engagement with the driving member at all times, a second driven member connected to said second axle and axially movable into and out of engagement with the driving member, means yieldably urging said second driven member into engagement with said driving member, cam means for automatically moving said second driven member axially with respect to said driving member and disengaging said driven member from said driving member when said second axle overruns, and means for maintaining said second driven member in disengaged position so long as the overrunning continues.

23. A differential mechanism according to claim 22 wherein said last named means includes a holdout ring frictionally rotatable on said second driven member and having axially extending projections which, upon disengagement of said second driven member from said driving member, come into abutment with cooperating portions of said cam means and maintain said second driven member in disengaged position so long as the overrunning continues.

ALBERT F. MYERS.

References Cited in the file of this patent

UNITED STATES PATENTS

| Number | Name | Date |
|---|---|---|
| 1,262,562 | Reiche | Apr. 9, 1918 |
| 2,348,717 | Banker | May 16, 1944 |
| 2,385,864 | Knoblock | Oct. 2, 1945 |
| 2,488,044 | Voigt | Nov. 15, 1949 |